United States Patent [19]

Beck

[11] Patent Number: 5,169,893

[45] Date of Patent: Dec. 8, 1992

[54] MIXTURES CONTAINING STEREOREGULAR POLYSTYRENE

[75] Inventor: Henry N. Beck, Walnut Creek, Calif.

[73] Assignee: The Dow Chemical Company, Midland, Mich.

[21] Appl. No.: 722,356

[22] Filed: Jun. 19, 1991

Related U.S. Application Data

[63] Continuation of Ser. No. 239,476, Sep. 1, 1988, abandoned, and a continuation of Ser. No. 547,540, Jun. 28, 1990, abandoned.

[51] Int. Cl.$^5$ .............................................. C08L 25/06
[52] U.S. Cl. ................................... 524/470; 524/471; 524/473; 524/476; 524/485; 524/486; 525/241; 526/347.2
[58] Field of Search ............... 525/241; 526/347.2; 524/470, 471, 473, 476, 485, 486

[56] References Cited

U.S. PATENT DOCUMENTS

| | | | |
|---|---|---|---|
| 2,988,783 | 6/1961 | Miller et al. | 264/290.5 |
| 3,019,077 | 1/1962 | Carey et al. | 264/203 |
| 3,046,245 | 7/1962 | Kern et al. | 524/108 |
| 3,061,570 | 10/1962 | Kern et al. | 260/30.4 |
| 3,069,406 | 12/1962 | Newman et al. | 260/93.5 |
| 3,078,139 | 2/1963 | Brown et al. | 264/210.6 |
| 3,092,891 | 6/1963 | Baratti | 428/394 |
| 3,303,159 | 2/1967 | Saunders | 524/486 |
| 3,342,920 | 9/1967 | Fukushima et al. | 264/184 |
| 3,396,136 | 8/1968 | Dickerson | 260/30.6 |
| 4,403,069 | 9/1983 | Keller et al. | 525/197 |
| 4,551,296 | 11/1985 | Kavesh et al. | 264/203 |
| 4,680,353 | 7/1987 | Ishihara et al. | 526/160 |
| 4,859,339 | 8/1989 | Wessling | 210/500.34 |

FOREIGN PATENT DOCUMENTS

| | | |
|---|---|---|
| 1102944 | 6/1981 | Canada . |
| 291536 | 11/1988 | European Pat. Off. . |
| 259809 | 11/1987 | Japan . |
| 63-081138 | 4/1988 | Japan . |
| 63-098431 | 4/1988 | Japan . |

OTHER PUBLICATIONS

Aubert, J. H., Polymer Prep., (Am. Chem. Soc., Div. Polym. Chem.), 28(1), 147-8, 1987.

Guenet, J. M., and McKenna, G. B., *J. Polymer Sci., Part B: Polym. Phys.*, 24(11), 2499-508 (1986).

Guenet, J. M., *Macromolecules*, 19(7), 1961-8 (1986).

Guenet, J. M., *Polym. Bull. (Berlin)*, 14(1), 105-8 (1985).

Roots, J., Nystroem, B., and Higgins, J. S., *Polym. Commun.*, 26(8), 229-31, (1985).

Guenet, J. M., Wittman, J. C., and Lotz, B., *Macromolecules*, 18(3), 420-7 (1985).

Atkins, E. D. T., Hill, M. J., Jarvis, D. A., Keller, A., Sarhene, E., and Shapiro, J. S., *Colloid Polym. Sci.*, 262(1), 22-45 (1984).

Sundararajan, P. R., Tyrer, N., and Bluhm, T., *Macromolecules*, 15(2), 286-90 (1982).

Sundararajan, P. R., Tyrer, N., and Bluhm, T., *Polym. Bull. (Berlin)*, 6(5-6), 285-9, (1982).

Aktins, E. D. T., Keller, A., Shapiro, J. S., and Lemstra, P. J., *Polymer*, 22(9), 1161-4 (1981).

Painter, P. C., Kessler, R. E., and Snyder, R. W., *J. Polym. Sci., Polym. Phys. Ed.*, 18(4), 723-9 (1980).

Wellinghoff, S., Shaw, J., and Baer, E., *Macromolecules*, 12(5), 932-9 (1979).

Girolamo, M., Keller, A., Miyasaka, K., and Overbergh, N., *J. Polym. Sci., Polym. Phys. Ed.*, 14(1), 39-61 (1976).

Lemstra, P. J., and Challa, G., *J. Polym. Sci., Polym. Phys. Ed.*, 13(9), 1809-17, (1975).

Helms, J. B., and Challa, G., *J. Polym. Sci., Part A-2*, 10(4), 761-5 (1972).

Blais, P., and Manley, R. St. John, *J. Polym. Sci., Polym. Phys. Ed.*, 4(6), 1022-4, (1966).

Guenet, Jean Michael, Macromolecules, 13(2), 387-91, 1980.

*Primary Examiner*—Paul R. Michl
*Assistant Examiner*—John J. Guarriello

[57] ABSTRACT

The invention is composition useful for preparing articles from syndiotactic polystyrene, or a mixture of syndiotactic polystyrene and isotactic polystyrene which comprises a homogeneous mixture of;

A. syndiotactic polystyrene, or a mixture of syndiotactic polystyrene and isotactic polystyrene; and
B. a solvent for the polystyrene wherein said solvent is a liquid at temperatures at which articles can be formed from the polystyrene:

wherein the mixture is viscous enough to form articles from the polystyrene.

4 Claims, No Drawings

MIXTURES CONTAINING STEREOREGULAR POLYSTYRENE

CROSS-REFERENCE TO RELATED APPLICATION

This is a continuation of application Ser. No. 239,476 filed Sept. 1, 1989, now abandoned.

BACKGROUND OF INVENTION

This invention relates to mixtures containing stereoregular polystyrene, in particular isotactic and syndiotactic polystyrene, and solvents for the polystyrene. This invention further relates to a process for the preparation of articles from such stereoregular polystyrene.

Syndiotactic polystyrene is a high performance form of polystyrene. It is desirable to prepare articles from this form of polystyrene. One difficulty in forming such articles is finding solvents for the polystyrene with which to form mixtures which can be used to form articles. Processes and mixtures which can be used to form articles from syndiotactic polystyrene are not known.

In many industries there is a drive to replace the metals used as structural materials with plastic materials. Plastic materials offer several advantages in that they are frequently lighter, do not interfere with magnetic or electrical signals, and often are cheaper than metals. One major disadvantage of plastic materials is that they are significantly weaker than many metals. To provide plastic structural articles and parts which have sufficient strength for the intended use, it is common to use composite materials which comprise a polymer or plastic matrix with high strength fibers in the plastic or polymer matrix to provide enhanced strength. Examples of composites made using such high strength fibers can be found in Harpell et al. U.S. Pat. No. 4,457,985 and Harpell et al. U.S. Pat. No. 4,403,012.

A series of patents have recently issued which relate to high strength fibers of polyethylene, polypropylene or copolymers of polyethylene and polypropylene. Such fibers are demonstrated as being useful in high strength composites. See Harpell et al. U.S. Pat. No. 4,563,392; Kavesh et al. U.S. Pat. No. 4,551,296; Harpell et al. U.S. Pat. No. 4,543,286; Kavesh et al. U.S. Pat. No. 4,536,536; Kavesh et al. U.S. Pat. No. 4,413,110; Harpell et al. U.S. Pat. No. 4,455,273; and Kavesh et al. U.S. Pat. No. 4,356,138. Other polymers which have been used to prepare fibers for composites include polyphenylene sulfide, polyetheretherketone and poly(paraphenylene benzobisthiazole).

The polyethylene and polypropylene fibers although exhibiting excellent modulus and tensile properties, have a relatively low heat distortion temperature and poor solvent resistance. The polyphenylene sulfide, polyetheretherketone, and poly(p-phenylene benzobisthiazole) polymers exhibit excellent heat distortion temperatures and solvent resistance, but are difficult to process and quite expensive.

What is needed is a process for preparing articles from syndiotactic polystyrene or mixtures containing syndiotactic polystyrene. What are also needed are mixtures useful in such processes. What are needed are fibers useful in composites which exhibit good solvent resistance and heat distortion properties, are processible, and prepared from materials which have reasonable costs. What are further needed are such fibers with high strength.

SUMMARY OF INVENTION

The invention consists of compositions useful for preparing articles from syndiotactic polystyrene, or a mixture of syndiotactic polystyrene and isotactic polystyrene which comprises a homogeneous mixture of;

A syndiotactic polystyrene, or a mixture of syndiotactic polystyrene and isotactic polystyrene; and B. a solvent for the polystyrene wherein said solvent is a liquid at temperatures at which articles can be formed from the polystyrene:

wherein the mixture is viscous enough to form articles from the polystyrene.

In another aspect the invention is a process for the formation of articles from syndiotactic polystyrene, or a mixture of isotactic polystyrene and syndiotactic polystyrene which comprises:

A. contacting syndiotactic polystyrene, or a mixture of isotactic polystyrene and syndiotactic polystyrene with a solvent for the polystyrene at elevated temperatures under conditions such that a homogeneous solution is formed which has sufficient viscosity to be formed into an article;

B. forming an article from the mixture at elevated temperatures;

C. quenching the articles by exposing the article to one or more zones under conditions such that the article solidifies;

D. removing the solvent for the polystyrene from the article.

The compositions of this invention allow the formation of articles from stereoregular polystyrene with relative ease.

DETAILED DESCRIPTION OF THE INVENTION

The compositions of this invention may be prepared from syndiotactic polystyrene or a mixture of syndiotactic and isotactic polystyrene. Syndiotactic polystyrene is polystyrene wherein the phenyl groups pendent from the chain alternate with respect to which side of the chain the phenyl groups are pendent. In other words, every other phenyl group is on the opposite side of the chain. Isotactic polystyrene has all of the phenyl rings on the same side of the chain. Standard polystyrene is referred to as atactic, meaning it has no stereoregularity, and the placement of the phenyl groups from the styrene with respect to each side of the chain is random, irregular, and follows no pattern.

Isotactic and syndiotactic polystyrene may be prepared by methods well known in the art. For procedures for the preparation of isotactic polystyrene, see Natta et al., Makromol. Chem., Vol. 28, p. 253 (1958) (relevant portions incorporated herein) by reference. For procedures for the preparation of syndiotactic polystyrene, see Japanese Patent 104818 (1987) and Ishihara, *Makromolecules*, 19 (9), 2464 (1986) relevant portions incorporated herein by reference.

Solvents useful in this invention are those which are a liquid at extrusion temperatures and which dissolve a sufficient amount of the polymer to result in a solution viscous enough to extrude. Preferred solvents include substituted benzenes of the formulas

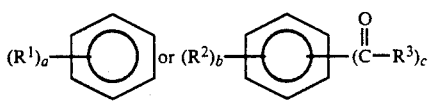

wherein
R¹ is alkyl, hydrogen, cycloalkyl, halo, or nitro;
R² is alkyl;
R³ is aryl, alkyl, carboxyaryl, or alkoxy;
a is an integer of from 1 to 3
b is an integer of from 0 to 3
c is an integer of from 1 to 2.
Other preferred solvents include alkyl, cyoloalkyl, aryl or aralkyl substituted pyrrolidinones; chloronaphthalenes; hydrogenated and partially hydrogenated naphthalenes: aryl substituted phenols; aryl ethers of the formula

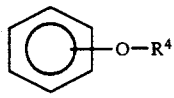

wherein R⁴ is alkyl, cycloalkyl, or aryl: diphenyl sulfone; benzyl alcohol; caprolactam: alkyl aliphatic esters containing a total of from 7 to 20 carbon atoms; alkyl aryl substituted formamides; dicyclohexyl; terphenyls; partially hydrogenated terphenyls; and mixtures of terphenyls and quaterphenyls; or mixtures of the solvents named herein.

Preferred substituted benzene solvents include o-dichlorobenzene, 1,2,3-trichlorobenzene, 1,2,4-trichlorobenzene, xylene nitrobenzene, acetophenone, methyl benzoate, ethyl benzoate, diphenyl phthalate, benzil, methyl salicylate, benzophenone, cyclohexyl benzene, n-butylbenzene, n-propylbenzene, phenol, dimethyl phthalate. Examples of preferred aryl ethers include phenetole (phenyl ethyl ether), diphenyl ether, and anisole. Examples of preferred pyrrolidinone solvents include 1-benzyl-2-pyrrolidinone, 1-cyclohexyl-2-pyrrolidinone, 1-ethyl-2-pyrrolidinone, 1-methyl-2-pyrrolidinone, 1-phenyl-2-pyrrolidinone. More preferred pyrrolidinone solvents include the alkyl and cycloalkyl substituted pyrrolidinones. Even more preferred pyrrolidinone solvents include 1-cyclohexyl2-pyrrolidonone, 1-ethyl-2-pyrrolidinone and 1-methyl-2-pyrrolidinone. Preferred ether solvents include anisole and diphenyl ether. Preferred hydrogenated naphthalene solvents include decahydronaphthalene (Deoalin) and tetrahydronaphthalene (Tetralin). Examples of terphenyls and partially hydrogenated terphenyls preferred include partially hydrogenated terphenyls, available from Monsanto under the tradename Therminol ® 66; mixed terphenyls and quaterphenyls, available from Monsanto under the tradename Therminol ® 75; and mixed terphenyls available from Monsanto under the Santowax ® R tradename. More preferred aliphatic esters are &hose methyl aliphatic esters with a total of from 10 to 14 carbon atoms, with methyl laurate being most preferred.

More preferred solvents include 1,2,3-trichlorobenzene, 1,24-trichlorobenzene, 1-ethyl-2-pyrrolidinone, 1-methyl-2-pyrrolidinone, 1-cyclohexyl-2-pyrrolidinone acetophenone, anisole, benzil, benzophenone, benzyl alcohol, caprolactam, decahydronaphthalene, tetrahydronaphthalene, diphenyl ether, ethyl benzoate, methyl salicylate, orthodichlorobenzene, mixed terphenyls and partially hydrogenated terphenyls or mixtures thereof. Even more preferred solvents include 1,2,3-trichlorobenzene, 1-ethyl-2-pyrrolidinone, anisole, tetrahydronapthalene, ortho-dichlorobenzene, and mixtures thereof. The most preferred solvent is ortho-dichlorobenzene.

The composition of this invention may be used to form articles from syndiotactic polystyrene, or a mixture of syndiotactie polystyrene and isotactic polystyrene. The polystyrene is contacted with one or more solvents at elevated temperatures. The mixture is thereafter formed into an article, and then quenched to solidify the the polystyrene. The solvent is then removed. The article may be of any shape desired. Some preferred shapes include sheets and fibers, with fibers being more preferred.

The weight percent of the polystyrene in the solvent should be such that there is sufficient viscosity to form an article from the polymer or extrude the polymer. In the embodiment where fibers are spun from the solution if the viscosity is too low the fibers coming out of the extruder will have no physical integrity, and if the viscosity is too high the mixture may not be readily extrudable. Preferably the solution has an upper limit on viscosity at the extrusion sheer rate of 1,000,000 poise, more preferably 500,000 poise and most preferably 100,000 poise. Preferably the solution has a lower limit on viscosity at the extrusion sheer rate of 100 poise, more preferably 1,000 poise and most preferably 10,000 poise.

The polystyrene molecular weight should be sufficient such that articles with reasonable integrity may be formed. The preferred upper limit on molecular weight (Mn) is 4,000,000, with 1,000,000 being more preferred. The preferred lower limit on molecular weight (Mn) is 200,000, with 400,000 being more preferred. Preferably the mixture contains up to 40 weight percent of polystyrene, more preferably between about 3 and 30 weight percent of polystyrene and most preferably between 5 and 15 percent polystyrene. The amount of polystyrene which may be dissolved in the various solvents is dependent upon the molecular weight of the polystyrene as the molecular weight of the polystyrene goes up the weight percent of the polystyrene which may go into solution may be lower.

The temperature at which the materials are contacted is such temperature at which the solution has sufficient viscosity to form an article and which does not degrade the polystyrene. The upper temperature is either the degradation temperature of the polystyrene or the boiling point of the solvent, and the lower temperature is that temperature at which the mixture is a single phase liquid. Above about 250° C. the polystyrene undergoes degradation. The upper temperature for the mixing step is preferably about 275° C., and more preferably about 160° C. The lower temperature for the mixing step is preferably 100° C. and more preferably 140° C.

It is desirable, although not essential, that the hot solution of polymer in solvent becomes gelatinous, or more preferably a rigid gel, when it is cooled to lower temperatures. Solutions of syndiotactic polystyrene usually readily form gels, when they are cooled to lower temperatures: isotactic polystyrene solutions may also form gels under such conditions. The ability to form gels from solutions containing both syndiotaetic and isotactic polymers can often be controlled to advantage by selection of the proper ratio of each polymer and the selection of the proper solvent. Where an article is to be prepared from both syndiotactic polystyrene and isotactic polystyrene the ratio of syndiotaetic polystyrene to isotactic polystyrene in the blend is any ratio which gives article with structural integrity and is preferably between about 0.1 and 20, more preferably between about 1 and 3, most preferably between about 0.75 and 1.25.

Once the mixture has been prepared it is formed into a desired shape In the embodiment where a fiber is formed, the fiber is extruded through a die usually a circular die, into the form of a fiber. The formation or extrusion is performed at elevated temperatures, the upper limit on the temperature is the lower of the boiling point of the solvent or the degradation temperature of the polystyrene. The lower limit on temperature is the lowest temperature at which the mixture is a single phase homogeneous solution and extrudable. Preferred upper limit on temperature is 250° C, with 160° C. being most preferred. The preferred lower limit on temperature is 100° C. with 140° C. being most preferred The temperature used to form the article is dependent upon the polymer concentration and molecular weight of the polystyrene, as the polymer concentration goes up the temperature necessary to form the articles goes up.

After formation of the article, the article is exposed to conditions whereby the article is quenched to solidify the article. Typically the article is exposed to or passed into or through a quench zone. Such quench zones may be gaseous quench zones, liquid quench zones or a combination thereof. The temperature of the gaseous quench zone is any temperature at which the article solidifies. The residence time in the gaseous quench zone is a sufficient time for the article to solidify. The preferred gas is air. Preferably the Gaseous quench zone is at a temperature of between 0 and 100° C., preferably the temperature is ambient temperature. In fiber formation the length of the gaseous quench zone is as short as possible, preferably between 0 and 18 inches more preferably between 0 and 6 inches. In a liquid quench zone the article is cooled and solidified, and a portion of the solvent may be removed from the fiber at this time. The liquid which may be used for the liquid quench is a liquid which is a solvent for the polystyrene solvent but which does not dissolve the polystyrene. Preferred liquid quench zone materials include water, lower alcohols. halogenated hydrocarbons, and perhalogenated carbon compounds. Perhalogenated carbon compounds are materials with a carbon backbone wherein all of the hydrogen atoms have been replaced with halogen atoms. Preferred quench materials include water and lower alcohols with lower alcohols being most preferred. Preferred lower alcohols are $C_{1-4}$ alcohols. The lower limit on the temperature of a liquid quench zone is that temperature at which the quench material freezes. The upper limit on the temperature of a liquid quench zone is the lower of the boiling point of the solvent, or that temperature above which the article does not undergo solidification when in contact with the quench material. Preferably the upper limit on temperature is 80° and more preferably 30° C. Preferably the lower limit on temperature is 0° C.

In the embodiment where a fiber is formed, the fiber is passed from the extruder through one or more quench zones. The fiber may be passed through one or more gaseous quench zones, one or more liquid quench zones. or both. In the quench zones the fiber is cooled, solidified and drawn down. In a preferred embodiment, the quench zone comprises an air quench zone and a liquid quench zone. In the air quench zone the fiber undergoes partial solidification and loss of some of the solvent, and in the liquid quench zone solidification is completed and more of the solvent is removed. During the quench period the fiber is also drawn down Preferably the lower limit on the draw down is from about 10:1, more preferably about 50:1. Preferably the upper limit on the draw down is about 100:1. Drawing down means the fibers are stretched such that the cross sectional area of the fiber is smaller at the end of the process and the draw down ratio is the ratio of the beginning cross sectional area to the final cross sectional area. The residence time of the fiber in a liquid quench bath is preferably greater or equal to 1 second, more preferably between about 1 and 10 seconds.

After quenching the article is subjected to a leach step wherein the remainder of the solvent in the article is removed. The material in which the leaching occurs is a material which is a solvent for the polystyrene solvent and which does not dissolve the polystyrene The materials which may be used in the leach are the same materials which may be used in a liquid quench. Temperatures of the leach bath are those temperatures at which the remaining solvent in the article is substantially removed. Preferably the leaching occurs at ambient temperatures, between about 20 and about 40° C. more preferably between about 20 and 30° C. The contact time with the leach material is a sufficient time such that the solvent is substantially removed. In the embodiment where a fiber is formed, the preferable residence time in the leach bath is greater then 30 seconds, more preferably between about 1 min. and 48 hours and most preferably between about 1 min. and 2 hours The leach may either be performed in a continuous on-line process, or may be performed in a batch fashion. The residence time is dependent upon the particular solvent, the article size, and the kinetics for removing the solvent from the article.

After forming the article and removing the solvent the article is then allowed to cool to ambient temperature.

When it is desired to improve the strength of a fiber, the fiber is reheated to a temperature at which the fiber can be redrawn. It is in the redraw process that the fiber is oriented such that the fiber has monoaxial orientation. The fiber is heated to a temperature between its 8lass transition temperature and its melting point. Preferable upper temperatures are 280° C. or below and more preferably 270° C. or below. Preferable lower temperatures are 150° C or above and more preferably 250° C or above. Thereafter the fiber is redrawn by stretching the fiber with tension: this is usually performed by running the fibers over a set of godets wherein the latter godets are going at a much faster rate than the earlier godets. The fiber is elongated at a ratio of between about 1.5:1 and about 10:1. Preferably the rate of elongation is 1 foot per minute or less. The redraw occurs while the fiber is at or near the temperature to which it was preheated. The fiber may be drawn in one or more stages with the options of using different temperatures, draw rates, and draw ratios in each stage. The fibers invention are monoaxially oriented to improve the tensile strength and modulus of the fibers. Preferably the fibers have a tensile strength of 10,000 psi or greater, more preferably 20,000 psi or greater and most preferably 2,500,000 psi or greater, and most preferably 5,000,000 psi or greater. The fibers may be extruded into any size, shape or length desired. Preferably the fibers have a heat distortion temperature of 150° C or greater, more preferably 170° C. or greater and most preferably 190° C. or greater. Preferably the fibers have a crystalline melting temperature of 200° C. or greater, more preferably 220° C. or greater, and most preferably 240° C. or greater.

The fibers can be incorporated into composites. The methods for such incorporation and the composites in which the fibers can be used in are well known to those skilled in the art.

SPECIFIC EMBODIMENTS

The following examples are included for illustrative purposes only and are not intended to limit the scope of the invention or the claims. Unless otherwise stated all parts and percentages are by weight.

EXAMPLE 1

6% isotactic polystyrene, 6% syndiotactic polystyrene, and 88% o-dichlorobenzene are mixed at 120° C. for 10 minutes. The resulting mixture, containing dissolved and partially dissolved polymer, is added to the melt pot of a pot extruder. This mixture is then heated to 170° C. and stirred for one hour under a nitrogen atmosphere. The mixture is then extruded at 110° C. through a 1.0 mm diameter spinnerette into an air quench zone with a length of about 4 to 6 inches, and then into methanol bath to form a gel fiber. The fiber path length in the methanol bath is about 1.9 inches. The line speed is about 10 to 20 feet per minute The fiber is collected and extracted in methanol for 24 hours to remove the o-diohlorobenzene. The extracted fiber is stretched 350% at 100° C. to produce a fiber with a tensile strength of 10,700 psi and a modulus of 1,300,000 psi with an elongation of 1.9%.

EXAMPLE 2

7% isotactic polystyrene, 3% syndiotactic polystyrene, and 90% o-dichlorobenzene are mixed at 120° C. for 10 minutes The resulting mixture containing dissolved and partially dissolved polymer, is added to the melt pot of a pot extruder This mixture is then heated to 170° C. and stirred for one hour under a nitrogen atmosphere. The mixture is then extruded at 110° C. through a 1.0 mm diameter spinnerette into an air quench zone with a length of about 4 to 6 inches, and then into methanol bath to form a gel fiber. The fiber path length in the methanol bath is about 18 inches. The line speed is about 10 to 20 feet per minute. The fiber is collected and extracted in methanol for 24 hours to remove the o-diohlorobenzene. The extracted fiber is stretched at a ratio between 3:1 and 4:1 at 150° C. to produce a fiber with a tensile strength of 23,000 psi and a modulus of 500,000 psi. The final elongation is 25%.

EXAMPLE 3

3.5% isotactic polystyrene, 1.5% syndiotactic polystyrene, and 95% o-diohlorobenzene are mixed at 120° C for 10 minutes. The resulting mixture, containing dissolved and partially dissolved polymer, is added to the melt pot of a pot extruder. This mixture is then heated to 170° C. and stirred for one hour under a nitrogen atmosphere. The mixture is then extruded at 130° C. through a 1.0 mm diameter spinnerette into an air quench zone with a length of about 4 to 6 inches, and then into methanol bath to form a Eel fiber. The fiber path length in the methanol bath is about 18 inches. The line speed is about 10 to 20 feet per minute. The fiber is collected and extracted in methanol for 24 hours to remove the o-dichlorobenzene. The extracted fiber is stretched 900% at 150° C. to produce a fiber with a tensile strength of 14,000 psi and a modulus of 1,300,000 psi.

EXAMPLE 4

5% isotactic polystyrene, 5% syndiotactic polystyrene, and 95% o-dichlorobenzene are mixed at 120° C. for 10 minutes. The resulting mixture, containing dissolved and partially dissolved polymer, is added to the melt pot of a pot extruder. This mixture is then heated to 170° C. and stirred for one hour under a nitrogen atmosphere. The mixture is then extruded at 110° C. through a 1.0 mm diameter spinnerette into an air quench zone with a length of about 4 to 6 inches, and then into methanol bath to form a gel fiber. The fiber path length in the methanol bath is about 18 inches. The line speed is about 10 to 20 feet per minute. The fiber is collected and extracted in methanol for 24 hours to remove the o-dichlorobenzene. The extracted fiber is stretched 300% at 130° C. to produce a fiber with a tensile strength of 29,000 psi and a modulus of 2,700,000 psi with a final elongation of 2.2%.

EXAMPLE 5

7% syndiotactic polystyrene, and 93% o-dichlorobenzene are mixed at 120° C for 10 minutes. The resulting mixture, containing dissolved and partially dissolved polymer, is added to the melt pot of a pot extruder. This mixture is then heated to 170° C. and stirred for one hour under a nitrogen atmosphere. The mixture is then extruded at 110° C through a 1.0 mm diameter spinnerette into an air quench zone with a length of about 4 to 6 inches, and then into methanol bath to form a gel fiber. The fiber path length in the methanol bath is 18 inches. The line speed is about 10 to 20 feet per minute. The fiber is collected and extracted in methanol for 24 hours to remove the o-dichlorobenzene. The extracted fiber is stretched 200% at 150° C. to produce a fiber with a tensile strength of 10,000 psi and a modulus of 1,300,000 psi.

EXAMPLE 7

Mixtures consisting of approximately five weight percent polymer, either in various organic compounds are prepared in two dram-capacity glass vials that are subsequently sealed with aluminum foil liners. The mixtures are weighed to a precision of one milligram. The vials are placed in an air-circulating oven at about 125-140° C. Dissolution behavior is observed by transmitted light at close range from an AO universal microscope illuminator at progressively increasing temperatures until complete dissolution is observed, until the boiling point of the solvent is closely approached, or until 300° C. is reached (the approximate ceiling temperature of the polystyrene). The temperature is increased in about 25° C. increments. The mixtures are allowed to remain at a given temperature for at least about 30 minutes before the temperature is increased further. The hot mixtures were cooled to room temperature: their appearance was noted after they were allowed to stand undisturbed overnight at room temperature. The results are compiled in Table 1. The polymer noted as "IPS42" refers to a sample of isotaetic polystyrene with a viscosity average molecular weight in excess of $2.6 \times 10^6$ daltons and contains about 9.4% atactic polystyrene (i.e. polymer extractable with hot methyl ethyl ketone). The polymer noted as "SYNDI02" is a sample of syndiotactic polystyrene with a weight-average molecular weight of about $5.6 \times 10^5$ daltons. The polymer noted as "SYNDIO" is a sample of syndiotactic polystyrene with a lower molecular weight.

| POLYMER | CONC. WGT. % | SOLVENT | APPROX. B.P., DEG. C. | TEMP. DEG. C. | SOLUBILITY | APPEARANCE AT ROOM TEMP |
|---|---|---|---|---|---|---|
| IPS42 | 5.01 | 1,2,3-trichlorobenzene | 218 | 191 | Soluble | Hard opaque solid |
| IPS42 | 5.08 | 1,2,4-trichlorobenzene | 214 | 190 | Partly soluble | |
| IPS42 | 5.08 | 1,2,4-trichlorobenzene | 214 | 202 | Soluble | Clear liquid |
| IPS42 | 5.14 | 1-benzyl-2-pyrrolidinone | 420 | 275 | Soluble | Amber clear viscous fluid |
| IPS42 | 5.14 | 1-benzyl-2-pyrrolidinone | 420 | 250 | Partly soluble | |
| IPS42 | 5.83 | 1-chloronaphthalene | 258 | 225 | Partly soluble | |
| IPS42 | 5.83 | 1-chloronaphthalene | 258 | 250 | Soluble | Clear moderately viscous fluid |
| IPS42 | 5.24 | 1-cyclohexyl-2-pyrrolidinone | 301 | 200 | Partly soluble | |
| IPS42 | 5.24 | 1-cyclohexyl-2-pyrrolidinone | 301 | 224 | Soluble | Amber clear thin jelly |
| IPS42 | 5.21 | 1-ethyl-2-pyrrolidinone | 206 | 141 | Swollen gel | |
| IPS42 | 5.21 | 1-ethyl-2-pyrrolidinone | 206 | 190 | Soluble | Yellow clear viscous fluid |
| IPS42 | 5.02 | 1-methyl-2-pyrrolidinone | 202 | 190 | Partly soluble | |
| IPS42 | 5.02 | 1-methyl-2-pyrrolidinone | 202 | 202 | Soluble | Yellow clear viscous fluid |
| IPS42 | 5.09 | 1-phenyl-2-pyrrolidinone | 345 | 250 | Mostly soluble | |
| IPS42 | 5.09 | 1-phenyl-2-pyrrolidinone | 345 | 274 | Soluble | Brown hard solid |
| IPS42 | 25.29 | 4-phenylphenol | 321 | 231 | Soluble | Opaque solid |
| IPS42 | 5.09 | 4-phenylphenol | 321 | 200 | Soluble | Tan opaque hard solid |
| IPS42 | 5.18 | acetophenone | 202 | 202 | Soluble | Clear liquid |
| IPS42 | 5.18 | acetophenone | 202 | 190 | Partly soluble | |
| IPS42 | 5.21 | anisole | 154 | 154 | Soluble | Clear viscous fluid |
| IPS42 | 5.19 | benzil | 347 | 200 | Soluble | Clear yellow viscous fluid |
| IPS42 | 5.19 | benzil | 347 | 150 | Partially soluble | |
| IPS42 | 5.08 | benzophenone | 305 | 202 | Soluble | Clear yellow moderately viscous fluid |
| IPS42 | 5.08 | benzophenone | 305 | 190 | Partly soluble | |
| IPS42 | 5.42 | benzyl alcohol | 205 | 190 | Almost soluble | |
| IPS42 | 5.42 | benzyl alcohol | 205 | 204 | Soluble | Cloudy firm gel |
| IPS42 | 4.97 | butyl stearate | 343 | 275 | Partly soluble | |
| IPS42 | 4.97 | butyl stearate | 343 | 299 | Hazy & soluble?? | Opaque non-homogeneous semisolid |
| IPS42 | 5.09 | caprolactam (epsilon) | 271 | 211 | Soluble | Opaque hard solid |
| IPS42 | 25.12 | carrolactam (epsilon) | 271 | 231 | Soluble | |
| IPS42 | 4.96 | decahydronaphthalene (decalin) | 190 | 190 | Soluble | Hazy liquid with bottom gel layer |
| IPS42 | 5.19 | dimethyl phthalate | 282 | 190 | Soluble | Clear liquid |
| IPS42 | 4.95 | dioctyl phthalate | 384 | 209 | Badly swollen | |
| IPS42 | 4.95 | dioctyl phthalate | 384 | 298 | Hazy & soluble?? | Hazy stiff gel |
| IPS42 | 5.31 | diphenyl ether | 259 | 190 | Partly soluble | |
| IPS42 | 5.31 | diphenyl ether | 259 | 202 | Soluble | Clear moderately viscous fluid |
| IPS42 | 5.19 | diphenyl sulfone | 379 | 166 | Almost soluble | |
| IPS42 | 5.19 | diphenyl sulfone | 379 | 200 | Soluble | Light tan opaque hard solid |
| IPS42 | 5.01 | ethyl benzoate | 212 | 202 | Soluble | Clear moderaly viscous fluid |
| IPS42 | 5.01 | ethyl benzoate | 212 | 190 | Partly soluble | |
| IPS42 | 5.10 | HB-40 (Monsanto) | 325 | 250 | Soluble | Yellow clear viscous fluid |
| IPS42 | 5.10 | HB-40 (Monsanto) | 325 | 225 | Partly soluble | |
| IPS42 | 5.05 | mesitylene(1,3,5-trimethylbenzene) | 163 | 161 | Almost soluble | Hazy viscous gelatinous fluid |
| IPS42 | 5.25 | methyl benzoate | 199 | 190 | Partly soluble | |
| IPS42 | 5.25 | methyl benzoate | 199 | 202 | Soluble | Clear liquid |
| IPS42 | 5.08 | methyl laurate | 262 | 202 | Almost soluble | |
| IPS42 | 5.08 | methyl laurate | 262 | 225 | Soluble | Cloudy rigid gel |
| IPS42 | 5.05 | methyl salicylate | 222 | 190 | Partly soluble | |
| IPS42 | 5.05 | methyl salicylate | 222 | 202 | Soluble | Hazy moderately viscous fluid |
| IPS42 | 5.01 | methyl myristate | 323 | 298 | Hazy & soluble?? | White opaque stiff gel |
| IPS42 | 5.01 | methyl myristate | 323 | 209 | Almost soluble | |
| IPS42 | 5.09 | methyl stearate | 359 | 249 | Mostly soluble | |
| IPS42 | 5.09 | methyl stearate | 359 | 299 | Hazy & soluble?? | Pale yellow hard solid |
| IPS42 | 5.09 | methyl stearate | 359 | 275 | Hazy & soluble?? | |
| IPS42 | 5.07 | nitrobenzene | 211 | 202 | Partly soluble | Yellow clear moderately viscous fluid |
| IPS42 | 5.14 | N,N-dimethylacetamide | 165 | 166 | Soluble | Clear fluid with white ppt. |
| IPS42 | 5.14 | N,N-dimethylacetamide | 165 | 151 | Almost soluble | |
| IPS42 | 5.08 | N,N-dimethylformamide | 153 | 151 | Almost soluble | White opaque slush |
| IPS42 | 5.04 | N,N-diphenylformamide | 337 | 249 | Soluble | Light brown solid |
| IPS42 | 5.04 | N,N-diphenylformamide | 337 | 225 | Gelatinous | |
| IPS42 | 5.16 | octyl acetate | 211 | 189 | Almost soluble | |
| IPS42 | 5.16 | octyl acetate | 211 | 209 | Hazy & soluble?? | Milky suspension |
| IPS42 | 9.86 | o-dichlorobenzene | 180 | 179 | Soluble | Clear fluid |
| IPS42 | 5.04 | Santowax R (Monsanto) | 364 | 166 | Gelantinous | |
| IPS42 | 5.04 | Santowax R (Monsanto) | 364 | 200 | Soluble | Tan hard solid |
| IPS42 | 24.89 | sulfolane | 285 | 241 | Soluble | Soft opaque solid |
| IPS42 | 4.86 | sulfolane | 285 | 240 | Soluble | Opaque solid gel |
| IPS42 | 5.14 | tetrahydronaphthalene (tetralin) | 207 | 141 | Almost soluble | |
| IPS42 | 5.14 | tetrahydronaphthalene (tetralin) | 207 | 190 | Soluble | Yellow clear liquid |

-continued

| POLYMER | CONC. WGT. % | SOLVENT | APPROX. B.P., DEG. C. | TEMP. DEG. C. | SOLUBILITY | APPEARANCE AT ROOM TEMP |
|---|---|---|---|---|---|---|
| IPS42 | 5.24 | Therminol 66 (Monsanto) | 340 | 225 | Partly soluble | |
| IPS42 | 5.24 | Therminol 66 (Monsanto) | 340 | 250 | Soluble | Yellow clear viscous fluid |
| IPS42 | 5.08 | Therminol 75 (Monsanto) | 385 | 200 | Soluble | Yellow rubbery elastic gel/solid |
| IPS42 | 5.08 | Therminol 75 (Monsanto) | 385 | 166 | Gelatinous | |
| IPS42 | 5.09 | xylene | 141 | 141 | Partly soluble | Hazy jelly |
| MIXTURE* | MIXTURE* | 1-cyclohexyl-2-pyrrolidinone | 301 | 275 | Soluble | Amber hazy moderately stiff gel |
| MIXTURE* | MIXTURE* | 1-cyclohexyl-2-pyrrolidinone | 301 | 259 | Almost soluble | |
| SYNDIO | 4.72 | 1,2,4-trichlorobenzene | 214 | 211 | Soluble | Cloudy soft gel |
| SYNDIO | 5.19 | 1-benzyl-2-pyrrolidinone | 420 | 211 | Soluble | Amber clear firm gel |
| SYNDIO | 4.86 | 1-chloronaphthalene | 250 | 211 | Soluble | Firm hazy gel |
| SYNDIO | 5.08 | 1-cyclohexyl-2-pyrrolidinone | 301 | 200 | Soluble | Amber soft gel |
| SYNDIO | 4.95 | 1-phenyl-2-pyrrolidinone | 345 | 200 | Soluble | Opaque hard solid |
| SYNDIO | 4.97 | 4-phenylphenol | 321 | 211 | Soluble | Opaque hard solid |
| SYNDIO | 25.12 | 4-phenylphenol | 321 | 221 | soluble | Opaque solid |
| SYNDIO | 5.16 | benzil | 347 | 211 | Soluble | Yellow hard solid |
| SYNDIO | 5.02 | benzophenone | 305 | 200 | Soluble | Clear firm gel |
| SYNDIO | 4.70 | caprolactam (epsilon) | 271 | 211 | Soluble | Opaque hard solid |
| SYNDIO | 24.94 | caprolactam (epsilon) | 271 | 221 | Soluble | Oapque hard solid |
| SYNDIO | 5.29 | diphenyl ether | 259 | 211 | Soluble | Firm hazy gel |
| SYNDIO | 5.35 | diphenyl sulfone | 379 | 231 | Soluble | Opaque hard solid |
| SYNDIO | 5.08 | N,N-diphenylformamide | 337 | 200 | Soluble | Opaque hard solid |
| SYNDIO | 5.21 | o-dichlorobenzene | 180 | 171 | Soluble | Firm hazy gel |
| SYNDIO | 4.77 | sulfolane | 285 | 217 | Not soluble | |
| SYNDIO | 4.77 | sulfolane | 285 | 231 | Soluble | Liquid slush |
| SYNDIO2 | 5.09 | 1,2,3-trichlorobenzene | 218 | 150 | Soluble | White opaque hard solid |
| SYNDIO2 | 5.14 | 1,2,4-trichlorobenzene | 214 | 136 | Soluble | Cloudy stiff gel |
| SYNDIO2 | 5.58 | 1-benzyl-2-pyrrolidinone | 420 | 224 | Soluble | Amber hazy stiff gel |
| SYNDIO2 | 5.58 | 1-benzyl-2-pyrrolidinone | 420 | 200 | Partly soluble | |
| SYNDIO2 | 5.26 | 1-chloronaphthalene | 258 | 136 | Soluble | Hazy stiff gel |
| SYNDIO2 | 5.16 | 1-cyclohexyl-2-pyrrolidinone | 301 | 136 | Partly soluble | |
| SYNDIO2 | 5.16 | 1-cyclohexyl-2-pyrrolidinone | 301 | 150 | Soluble | Amber soft hazy gel |
| SYNDIO2 | 5.13 | 1-ethyl-2-pyrrolidinone | 296 | 161 | Soluble | Pale yellow opaque slush |
| SYNDIO2 | 5.15 | 1-methyl-2-pyrrolidinone | 202 | 136 | Soluble | Cloudy stiff gel |
| SYNDIO2 | 5.04 | 1-phenyl-2-pyrrolidinone | 345 | 200 | Soluble | Tan opaque hard solid |
| SYNDIO2 | 5.09 | 4-phenylphenol | 321 | 225 | Soluble | White opaque hard solid |
| SYNDIO2 | 5.09 | 4-phenylphenol | 321 | 200 | Almost soluble | |
| SYNDIO2 | 5.13 | acetophenone | 202 | 165 | Soluble | Cloudy gel above solid |
| SYNDIO2 | 5.13 | acetophenone | 202 | 150 | Almost soluble | |
| SYNDIO2 | 5.01 | anisole | 154 | 153 | Soluble | Cloudy stiff gel |
| SYNDIO2 | 5.04 | benzil | 347 | 200 | Soluble | Yellow opaque hard solid |
| SYNDIO2 | 5.04 | benzil | 347 | 150 | Partially soluble | |
| SYNDIO2 | 5.05 | benzophenone | 305 | 188 | Soluble | Clear stiff gel |
| SYNDIO2 | 5.05 | benzophenone | 305 | 165 | Partly soluble | |
| SYNDIO2 | 5.67 | benzyl alcohol | 205 | 190 | Almost soluble | |
| SYNDIO2 | 5.67 | benzyl alcohol | 205 | 204 | Soluble | White opaque soft gel |
| SYNDIO2 | 5.12 | butyl stearate | 343 | 273 | Soluble | White opaque fluid |
| SYNDIO2 | 5.12 | butyl stearate | 343 | 250 | Partly soluble | |
| SYNDIO2 | 5.09 | caprolactam (epsilon) | 271 | 200 | Soluble | Hard solid |
| SYNDIO2 | 5.10 | cyclohexanone | 155 | 150 | Soluble | Soft gel |
| SYNDIO2 | 5.20 | decahydronaphthalene (decalin) | 190 | 188 | Almost soluble | Moderately stiff slush |
| SYNDIO2 | 5.18 | dimethyl phthalate | 282 | 200 | Partly soluble | |
| SYNDIO2 | 5.18 | dimethyl phthalate | 282 | 224 | Soluble | White opaque slush |
| SYNDIO2 | 5.02 | diphenyl ether | 259 | 150 | Soluble | Clear stiff gel |
| SYNDIO2 | 5.02 | diphenyl ether | 259 | 136 | Partly soluble | |
| SYNDIO2 | 5.28 | diphenyl sulfone | 379 | 225 | Soluble | Pale tan hard solid |
| SYNDIO2 | 5.19 | ethyl benzoate | 212 | 165 | Almost soluble | |
| SYNDIO2 | 5.19 | ethyl benzoate | 212 | 188 | Soluble | Stiff pale yellow hazy gel |
| SYNDIO2 | 5.34 | HB-40 (Monsanto) | 325 | 151 | Partly soluble | |
| SYNDIO2 | 5.34 | HB-40 (Monsanto) | 325 | 200 | Soluble | Slightly hazy pale yellow firm gel |
| SYNDIO2 | 5.13 | Mesitylene (1,3,5-trimethyl-benzene) | 163 | 161 | Almost soluble | Stiff heterogeneous gel |
| SYNDIO2 | 4.97 | methyl benzoate | 199 | 150 | Soluble | Cloudy stiff gel |
| SYNDIO2 | 5.04 | methyl laurate | 262 | 250 | Soluble | White opaque slush |
| SYNDIO2 | 5.04 | methyl laurate | 262 | 224 | Almost soluble | |
| SYNDIO2 | 4.96 | methyl myristate | 323 | 241 | Hazy & soluble?? | |
| SYNDIO2 | 4.96 | methyl myristate | 323 | 255 | Soluble | Opaque white slush |
| SYNDIO2 | 5.07 | methyl salicylate | 222 | 175 | Soluble | Cloudy stiff gel |
| SYNDIO2 | 5.07 | methyl salicylate | 222 | 150 | Not soluble | |
| SYNDIO2 | 5.06 | methyl stearate | 359 | 273 | Soluble | Opaque solid |
| SYNDIO2 | 5.06 | methyl stearate | 359 | 250 | Partly soluble | |
| SYNDIO2 | 5.13 | nitrobenzene | 211 | 151 | Soluble | Yellow cloudy firm gel |
| SYNDIO2 | 4.82 | N,N-dimethylacetamide | 165 | 165 | Not Soluble | White slush |
| SYNDIO2 | 5.04 | N,N-diphenylformamide | 337 | 225 | Soluble | Brown hard solid |
| SYNDIO2 | 5.04 | N,N-diphenylformamide | 337 | 200 | Almost soluble | |

| POLYMER | CONC. WGT. % | SOLVENT | APPROX. B.P., DEG. C. | TEMP. DEG. C. | SOLUBILITY | APPEARANCE AT ROOM TEMP |
|---|---|---|---|---|---|---|
| SYNDIO2 | 5.13 | o-dichlorobenzene | 180 | 150 | Soluble | Cloudy stiff gel |
| SYNDIO2 | 5.13 | o-dichlorobenzene | 180 | 136 | Partly soluble | |
| SYNDIO2 | 5.00 | Santowax R (Monsanto) | 364 | 166 | Partially soluble | |
| SYNDIO2 | 5.00 | Santowax R (Monsanto) | 364 | 200 | Soluble | Tan hard solid |
| SYNDIO2 | 5.00 | sulfolane | 285 | 200 | Not soluble | |
| SYNDIO2 | 5.00 | sulfolane | 285 | 249 | Soluble | Light tan opaque firm gel |
| SYNDIO2 | 5.00 | sulfolane | 285 | 225 | Partially soluble | |
| SYNDIO2 | 5.27 | tetrahydronaphthalene (tetralin) | 207 | 136 | Soluble | Stiff hazy gel |
| SYNDIO2 | 5.15 | Therminol 66 (Monsanto) | 340 | 200 | Soluble | Slightly hazy pale yellow soft gel |
| SYNDIO2 | 5.15 | Therminol 66 (Monsanto) | 340 | 151 | Partly soluble | |
| SYNDIO2 | 4.99 | Therminol 75 (Monsanto) | 385 | 200 | Soluble | Yellow opaque firm solid/gel |
| SYNDIO2 | 5.25 | xylene | 141 | 136 | Soluble | Moderately stiff white opaque gel |
| IPS42 | 5.01 | cyclohexylbenzene | 239 | 158 | Soluble | Water-clear liquid |
| IPS42 | 5.00 | dicylohexyl | 227 | 181 | Almost soluble | |
| IPS42 | 5.00 | dicyclohexyl | 227 | 200 | Soluble | Clear liquid with ppt. |
| IPS42 | 4.99 | methyl caproate | 151 | 151 | Mostly dissolved | White opaque homogeneous slush |
| IPS42 | 4.99 | methyl caproate | 151 | 150 | Heavily swollen | |
| IPS42 | 4.99 | methyl caprylate | 194 | 151 | Not soluble | |
| IPS42 | 4.99 | methyl caprylate | 194 | 169 | Heavily swollen | |
| IPS42 | 4.99 | methyl caprylate | 194 | 183 | Mostly soluble | Opaque white homogeneous slush |
| IPS42 | 4.99 | methyl enanthate | 172 | 151 | Not soluble | |
| IPS42 | 4.99 | methyl enanthate | 172 | 172 | Mostly dissolved | Opaque white homogeneous slush |
| IPS42 | 4.99 | methyl valerate | 128 | 128 | Not soluble | Water-clear liquid with polymer sediment |
| IPS42 | 5.00 | n-butylbenzene | 183 | 151 | Mostly dissolved | |
| IPS42 | 5.00 | n-butylbenzene | 183 | 169 | Soluble | Water-clear liquid |
| IPS42 | 5.01 | n-propylbenzene | 159 | 158 | Soluble | Clear mod. viscous fluid |
| IPS42 | 5.01 | n-propylbenzene | 159 | 155 | Heavily swollen | |
| IPS42 | 4.98 | phenetole | 169 | 128 | Heavily swollen | |
| IPS42 | 4.98 | phenetole | 169 | 151 | Mostly dissolved | |
| IPS42 | 4.98 | phenetole | 169 | 169 | Soluble | Clear pink mod. viscous fluid |
| IPS42 | 5.08 | phenol | 182 | 155 | Swollen | |
| IPS42 | 5.08 | phenol | 182 | 158 | Soluble & viscous | Clear dark orange viscous fluid |
| SYNDI02 | 4.98 | cyclohexylbenzene | 239 | 181 | Soluble | Cloudy firm gel |
| SYNDI02 | 4.98 | cyclohexylbenzene | 239 | 158 | Almost Soluble | |
| SYNDI02 | 4.99 | dicyclohexyl | 227 | 200 | Mostly soluble | |
| SYNDI02 | 4.99 | dicyclohexyl | 227 | 225 | Soluble | Homogeneous slush |
| SYNDI02 | 4.98 | methyl caproate | 151 | 151 | Not soluble | Clear liquid with solid polymer sediment |
| SYNDI02 | 5.01 | methyl caprylate | 194 | 194 | Not soluble | Milky liquid with solid sediment |
| SYNDI02 | 4.94 | methyl enanthate | 172 | 172 | Not soluble | Water-clear liquid with polymer sediment |
| SYNDI02 | 4.99 | methyl valerate | 128 | 128 | Not soluble | Water-clear liquid with solid sediment |
| SYNDI02 | 4.96 | n-butylbenzene | 182 | 183 | Mostly soluble | White opaque soft gel |
| SYNDI02 | 4.96 | n-butylbenzene | 182 | 169 | Heavily swollen | |
| SYNDI02 | 4.96 | n-butylbenzene | 182 | 151 | Not soluble | |
| SYNDI02 | 5.00 | n-propylbenzene | 159 | 158 | Soluble | White opaque firm gel |
| SYNDI02 | 5.04 | phenetole | 169 | 128 | Swollen | |
| SYNDI02 | 5.04 | phenetole | 169 | 150 | Soluble | Hazy pink firm gel |
| SYNDI02 | 5.35 | phenol | 182 | 155 | Swollen | |
| SYNDI02 | 5.35 | phenol | 182 | 158 | Almost soluble | |
| SYNDI02 | 5.35 | phenol | 182 | 181 | Soluble | Opaque white firm gel |

*Mixture = SYNDI02 (3.16%) + IPS42 (3.06%)

What is claimed is:

1. A composition comprising a homogeneous mixture of:
A. syndiotactic polystyrene; and
B. a solvent for the syndiotactic polystyrene selected from the group consisting alkyl-, cycloalkyl-, aryl-, or aralkyl-substituted pyrrolidinones; chloronaphthalene; hydrogenated or partially hydrogenated naphthalenes; diphenyl sulfone; benzyl alcohol; caprolactam; alkyl aliphatic esters containing a total of from 7 to 20 carbon atoms; alkyl or aryl substituted formamides; dicyclohexyl; terphenyls; partially hydrogenated terphenyls; mixtures of terpheylis and quaterphenyls; compounds of the formula

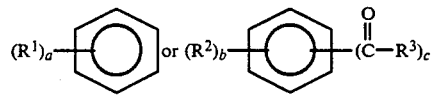

wherein
$R^1$ is cycloalkyl, halo, or nitro;
$R^2$ is alkyl;
$R^3$ is aryl, alkyl, carboxyaryl, or alkoxy;

a is an integer of from 1 to 3;
b is an integer of from 0 to 3;
c is an integer of from 1 to 2;
aryl substituted phenols; and ethers of the formula

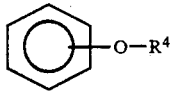

wherein $R^4$ is alkyl, cycloalkyl, aryl or a mixture thereof, wherein said solvent is a liquid at temperatures at which articles can be formed from the homogeneous mixture and the homogeneous mixture is viscous enough to form articles upon the quenching thereof.

2. The composition of claim 1 wherein the homogeneous mixture comprises up to about 40 percent by weight syndiotactic polystyrene or a mixture of syndiotactic polystyrene and isotactic polystyrene.

3. The composition of claim 2 wherein the homogeneous mixture comprises between about 3 and about 30 weight percent of syndiotactic polystyrene or a mixture of syndiotactic polystyrene and isotactic polystyrene.

4. The composition of claim 3 wherein the solvent ,is o-dichlorobenzene, 1,2,3-trichlorobenzene. 1,2,3-trimethylbenzene, 1,2,3-trichlorobenzene, xylene, nitrobenzene, acetophenone, methyl benzoate, ethyl benzoate, diphenyl phthalate, benzil, methyl salicylate, benzophenone, cyclohexyl benzene, n-butylbenzene, n-propylbenzene, phenol. dimethyl phthalate, phenyl ethyl ether, diphenyl ether, anisole, 1-benzyl-2-pyrrolidinone, 1-cyclohexyl-2-pyrrolidinone. 1-ethyl-2-pyrrolidinone, 1-methyl-2-pyrrolidinone, 1-phenyl-2pyrrolinone, anisole, diphenyl ether, decahydronaphthalene, tetrahydronaphthalene, terphenyls, partially hydrogenated terphenyls. mixed terphenyls, quaterphenyls, chloronaphthalene, diphenyl sulfone, benzyl alcohol, caprolactam, dicyclohexyl, methyl aliphatic esters with a total of from 10 to 14 carbon atoms. N,N-dimethylacetamide, N,N-dimethylformamide, N,N-diphenylformamide or a mixture thereof.

* * * * *